2,485,950

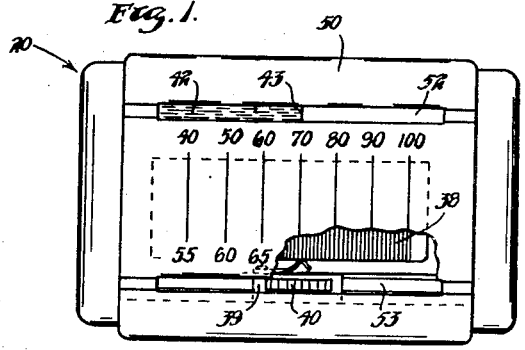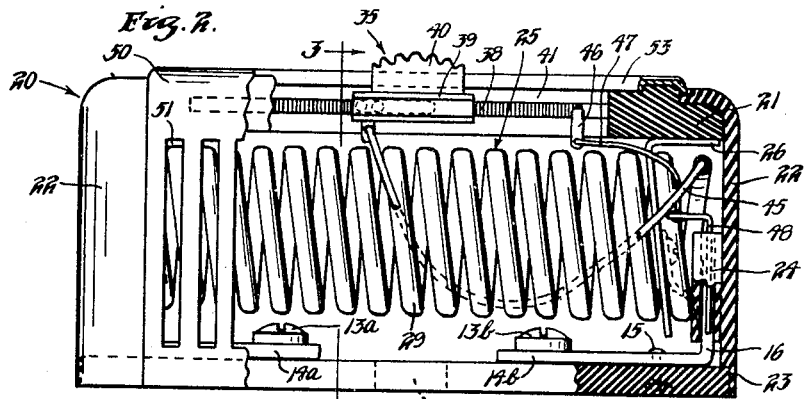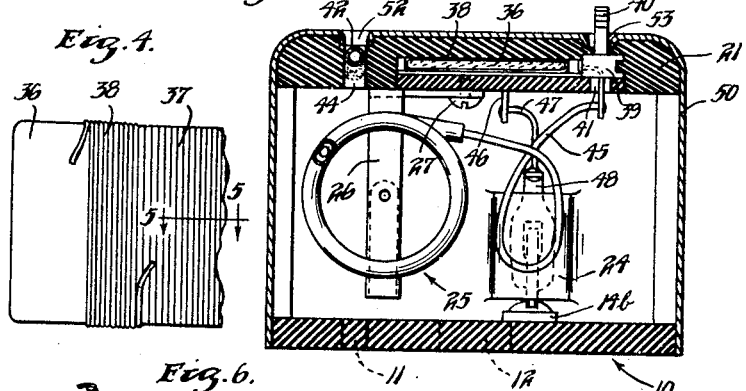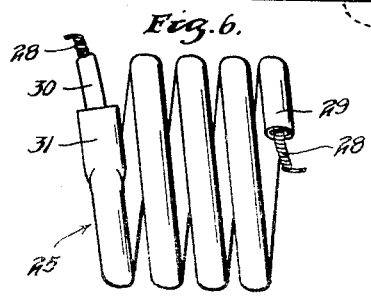
INVENTORS
JOHN M. WILSON
BENJAMIN CYR
BY
George H. Fisher
ATTORNEY Patented Oct. 25, 1949

UNITED STATES PATENT OFFICE 2,485,950

ELECTRIC THERMOSTAT

John M. Wilson and Benjamin Cyr, Minneapolis, Minn., assignors to Minneapolis-Honeywell Regulator Company, Minneapolis, Minn., a corporation of Delaware Application November 30, 1945, Serial No. 631,900

13 Claims. (Cl. 201—48)

Our invention relates to a space thermostat for use in temperature control apparatus using a temperature sensitive electrical resistance element as a component part of an electrical system for controlling the operation of an air conditioning system, such as a furnace, in response to the ambient temperature in the space whose temperature is to be controlled.

The present device is in general made up of a temperature responsive resistance element composed of material having a high temperature coefficient of resistance, a variable resistor connected in series with the temperature responsive element, and a casing enclosing the device which induces the flow of an air stream over the measuring element in an unobstructed path.

One of the novel features of the present device is in the improved temperature sensitive element. In order to obtain an element of sufficiently high ohmic resistance, a considerable length of wire must be used, which if left exposed to the atmosphere has a tendency to collect an insulating layer of dust, and if used with a fabric covering, the fabric has a tendency to absorb moisture from the atmosphere. To avoid these difficulties we have helically coiled the wire in such a manner as to substantially reduce its length and hermetically sealed it within a metallic casing having a high rate of heat transfer, to protect the wire from the harmful effects of direct atmospheric contact without impairing its sensitivity. The metallic casing which is of tubular form is also helically coiled so as to reduce the amount of space which it occupies.

To provide for adjustment of the temperature in the space whose temperature is being regulated by the device, a variable resistor is connected in series with the temperature sensitive resistance element to regulate the amount of resistance in the temperature sensitive element. A manually operable control portion of the variable resistor has associated with it a calibrated index scale so that the user may set the manually operable portion at a point on the index scale which corresponds to the desired temperature within the controlled space.

A protective casing formed in an artistically pleasing appearance and provided with ventilating apertures, in what corresponds to the upper and lower surfaces of the device when it is fastened to a vertical wall, is mounted in protecting relationship to the control elements mentioned heretofore. The position of the coils of the temperature sensitive element and the variable resistor within the casing with relation to the apertures, is such as to provide for the unobstructed flow of air through the casing and into maximum contact with the temperature sensitive element. Thus a slight amount of heat radiated by current passing through the coil is utilized to create an air current which will maintain the coil in contact with a slight but constantly moving stream of air passing through the ventilating apertures from the space whose temperature is being controlled.

The device is intended to be mounted on a vertical wall structure within the space whose temperature it will control. To provide a structure which will enclose the fastening means, and to simplify the task of assembling the device it may be made in a plurality of sub-assemblies as shown in the drawings and described hereinafter.

One object of the invention is to provide a space thermostat that utilizes an improved electrical resistance element for measuring ambient temperature, which is constructed and mounted in such a manner as to give both efficient and reliable results.

Another object is to provide in such a device, a temperature sensitive element of high resistance, that is of compact size and shape, and is so constructed as to be protected from dust and moisture which would otherwise impair its sensitiveness or reliability.

Another object is to combine a temperature sensitive resistance element of the type described above with a variable resistor in a ventilating casing in such a manner as to provide variable control of the electrical resistance of the temperature sensitive element without interfering with air flow through the casing.

A further object is to provide in a space thermostat, the combination of a temperature responsive resistance element for measurement of temperature and a variable resistor connected in series therewith, the latter member having a temperature calibrated manually operable portion cooperable with an index for indicating the desired temperature within the controlled space.

Other and further objects will become apparent from the following detailed description, the appended claims, and the attached drawing in which:

Figure 1 is a side elevation of the device as adapted for wall mounting with a portion of the cover broken away;

Figure 2 is an enlarged view as seen from the bottom of Figure 1, with some portions broken away and others show in cross-section;

Figure 3 is a cross-section taken on the lines

3—3 of Figure 2, looking in the direction of the arrows;

Figure 4 shows constructional details of a portion of the variable resistor partially shown in Figures 1 and 2;

Figure 5 shows a cross-section of the core structure upon which the wire of the variable resistor is wound; and Figure 6 shows constructional details of the temperature measuring element shown in Figure 2.

Referring now to the several figures of the drawing, the structural features of the device are explained in detail. General reference numeral 10 which constitutes the first major sub-assembly, indicates a base member formed of insulating material, having a pair of apertures therein, one of which is indicated at 11 to receive screws or the like, to fasten the device on a wall in the position shown in Figure 1. Another aperture 12 in the base member is provided to receive a pair of wires which are adapted to be connected to the opposite terminal screws 13a and 13b. A pair of metallic conductors 14a and 14b which are in electrical contact with the terminals 13a and 13b and secured to the base member 10 by rivets 15 having projections which are angulary disposed with relation to the base 10 as indicated by reference numeral 16. The projections 16, of which there are two but only one is shown, are provided to give both electrical and mechanical connections to the operative portion of the device as will be explained hereinafter.

A supporting structure which constitutes the second major sub-assembly of the device is indicated by the general reference numeral 20 and consists of a flat surface 21 having dependent lateral legs 22 positioned at either end. The legs 22 have an internal indented surface 23 so that the legs may fit over the opposite lateral ends of base 10, flush with the lower surface thereof. A pair of spring clips, one of which is indicated by reference numeral 24, are positioned on the inner surfaces of each of the legs 22 to provide frictional socket connectors adapted to receive and resiliently engage the two angular projections 16 of the metallic conductors 14a and 14b. From the foregoing description, it should be evident that the supporting member 20 is adapted to be mounted on and frictionally engaged with the base 10, by means of the oppositely situated pairs of connecting members 16 and 24, which furnish both electrical connections and mechanical support between the two members 10 and 20.

Within the interior of the supporting member 20 a temperature sensitive helix indicated by general reference numeral 25 is supported on the under portion of the flat surface 21 of the supporting member 20 by means of angular brackets 26 located adjacent each of the legs 22 and secured to portion 21 by screws 27.

The temperature sensitive element, which in the present application is intended to be provided with a resistance of approximately 4,000 ohms, is shown in its constructional detail in Figure 6. Approximately 180 feet of fine wire composed of a nickel-iron alloy is helically coiled as shown, to substantially reduce the length of the wire. To provide electrical insulation, the helically coiled wire indicated by reference numeral 28, is coated with varnish before it is inserted in an aluminum tube indicated by reference numeral 29. Aluminum is used because it is very ductile and has a high heat transfer capacity, although any other metal having these characteristics might be used. An important feature of the sensitive element 25 is that the resistance wire is protected against dust and moisture. It has been our experience that when the temperature measuring resistance wire is exposed to the atmosphere, a layer of dust which may have insulating properties forms on the wire in such a way as to reduce its sensitivity. On the other hand, wire used for this purpose is frequently covered with an insulating fabric, which fabric has a tendency to absorb moisture from the air in such a manner that it tends to short-circuit the current to the resistance wire and thereby impair its value. To assure that the resistance wire 28 will remain entirely free from both dust and moisture within the aluminum tube 29, a resilient sleeve member 30 formed of rubber or synthetic plastic is slidably positioned over the protruding ends of the wire 28 and sealed within the ends of tube 29 by flattening the end of the tube about the resilient sleeve 30 in the manner shown at 31. In actual production, the temperature sensitive element is formed by helically winding the resistance wire 28 about the outer periphery of a thin rod. The aluminum casing which is produced as straight tubular stock, is slidably positioned over the assembly and the rod is removed, leaving the coiled wire, which has been previously coated with varnish, within the tube. The resilient sleeves 30 are then slid over the protruding ends of the coiled resistance wire and clamped by flattening the ends of the metal tube; whereafter the assembly is then coiled about a mandrel to form a helix in the manner shown.

Referring now to Figures 1-5, a variable resistor indicated by general reference numeral 35 is shown in the form of a rheostat, which is provided to adjustably alter the amount of electrical resistance through the temperature sensitive resistance wire 28 within element 25. A flat core structure formed of insulating material and shown in Figures 4 and 5 as reference numeral 36 is provided with a continuous thread 37 within which a winding 38 of flat resistance wire is mounted. A conventional spring slider 39 slidably engages one edge of the flat wire 38 in the manner shown in Figures 1, 2 and 3. A manually movable portion 40 of the slider 39 extends through an aperture 41 in the flat surface 21 to provide for manual adjustment of the slider 39 with respect to the wound wire 38.

A conventional glass tube thermometer 42 having a visible mercury column 43 is clamped in an aperture 44 of the flat surface 21, which aperture extends parallel to aperture 41.

Referring now to Figures 2 and 3, one end of wire 28, covered with a sleeve 30, extends from one end of the temperature responsive helix 25 in the form of a flexible loop 45 to the slider 39. At the right extremity of the variable resistor 35 is shown a member 46 which is in electrical contact with the end of wire 38, and a connector 47 that extends from member 46 to another member 48 which is in electrical contact with spring clip 24. The opposite end of wire 28 (not shown) is connected to conductor 14a by means similar to members 48 and 24. Thus current will enter the device through terminal 13a, conductor 14a, connectors 16 and 24 (not shown), wire 28 of member 25, loop 45, slider 39, wire 38 of resistor 35, member 46, connector 47, member 48, connectors 24 and 16, conductor 14b and return through terminal 13b.

Shown in Figures 1 and 2 is the third major sub-assembly consisting of a cover member indicated by reference numeral 50 which is provided with a plurality of apertures or louvers 51 in its sides which correspond to the upper and lower surfaces of the cover as shown in Figure 1. The apertures 51 are so disposed in the cover member 50 that air passing vertically through these apertures is in a substantially vertical plane with respect to the position of the coils of helix 25. On the side of cover 50, an aperture 52 is provided which coincides with aperture 44 in the flat surface 21, to give visual observation of the mercury column 43 of thermometer 42. A second aperture 53 which coincides with aperture 41 in flat surface 21, provides for the extension through cover 50 of the manually operable portion 40 of the variable resistor 35. A calibrated temperature scale, shown in degrees Fahrenheit is stamped or printed adjacent each of the apertures 52 and 53 on the side of the cover, to give visual indication of the temperature indicated by thermometer 42, and to inform a user of the correct position to which member 40 must be placed to give a desired space temperature. The cover member 50 is slidably mounted in grooves in the outer surfaces of legs 22 in such a manner as to enclose only the central portion of supporting member 20 as may be seen in Figure 1, and is clamped or fastened to the base member 10 by conventional fastening means.

From the foregoing, it will be evident that we prefer to construct the device presented herein in three sub-assemblies indicated by reference numerals 10, 20 and 50, which permit the device to be easily made and assembled for mounting on a wall structure with the fastening means enclosed within the interior of the casing. A further feature is that the temperature sensitive helix 25 is positioned in spaced relation to the base and to the apertures 51 in the cover member so that the vertical plane of the air passing through the casing is disposed at a 90 degree angle to the horizontal axis of the temperature sensitive helix, and thus the air current which passes vertically through the casing can easily flow over and between the adjacent coils of the helix. Because of the electrical resistance of the helix, its temperature will, when operative, be generally above that of the ambient air surrounding the device and therefore it will have a tendency to cause a circulation of air through the apertures. It is important, therefore, that the variable resistor and other structural features of the device be positioned away from this air path so as to present a minimum of obstruction to its flow through the device.

It will be evident to anyone skilled in the art that numerous substitutions may be made within the spirit of the invention and therefore we do not wish to be restricted to the single disclosure described herein inasmuch as experiment has shown us that the construction of the device may assume numerous forms which are still within the spirit of the invention. Therefore, we do not wish to be restricted to the single disclosure of the invention described herein but rather to the interpretation of the claims appended hereto.

We claim as our invention:

1. A space thermostat for use with temperature control apparatus using temperature sensitive resistance elements including, a base member adapted for wall mounting, a cover member detachably secured to said base member having apertures in the top and bottom walls thereof, a temperature responsive resistor having a high coefficient of resistance mounted in spaced relation to said base adjacent the apertures in said cover member and with its longitudinal axis horizontally disposed, said resistor being operative to induce the flow of a vertical air stream through the apertures in said cover member, a variable resistor connected in series with said temperature responsive resistance, said variable resistor being mounted adjacent said cover in spaced relation to said temperature responsive resistor and to one side of the path of said induced vertical air stream, and a manually operable control portion of said variable resistor extending through the exterior of said cover to provide adjustment of said variable resistor.

2. A space thermostat, comprising, a base member adapted for wall mounting, a cover member detachably secured to said base member, said cover member having apertures in the top and bottom walls thereof, a coiled temperature sensitive resistance element having a high temperature coefficient of resistance mounted in spaced relation to said base member and adjacent the apertures in said cover member, said resistance element being operative to induce the flow of a vertical air stream through the apertures in said cover and between the adjacent turns of said coil, a variable resistor connected in series with said temperature sensitive resistance element, said variable resistor being disposed within said cover in spaced relation to said temperature sensitive element, and a manually operable control portion of said variable resistor extending through the exterior of said cover to provide adjustment of said variable resistor.

3. A space thermostat comprising, a base member adapted for mounting on a vertical wall, a removable enclosure cooperable with said base member, said enclosure having openings on wall portions which correspond to the upper and lower walls when mounted to provide a vertical air passage through said enclosure, a temperature responsive resistance wire having a high temperature coefficient of resistance, a coiled metallic tube for supporting said wire in said air passage in spaced relation to said base member, a variable resistor connected in series with said temperature responsive resistance wire, said variable resistor being mounted within said enclosure in spaced relation to said metallic coil, and a manually operable control portion of said variable resistor extending through a portion of said enclosure to provide exterior adjustment of said variable resistor.

4. In a space thermostat for use with temperature control apparatus using temperature sensitive resistance elements, a base member, a housing detachably secured to said base member, a temperature sensitive coiled resistance element secured within said housing with the coils of the element spaced from the base member and substantially vertically disposed, said housing having apertures through the upper and lower walls thereof so disposed that air passing vertically through said apertures tends to pass between adjacent coils of said element, a rheostat electrically connected with said coiled element and disposed within said housing out of the path of air passing through said apertures and said coiled element, and adjusting means for said rheostat extending through said cover member.

5. A space thermostat, comprising, a base member, a temperature sensitive helix supported in spaced relation to the base member and with its longitudinal axis horizontally disposed, a cover member detachably secured to said base member and enclosing and supporting said helix, said cover having apertures through the upper and lower walls thereof so disposed that air passing vertically through said apertures tends to pass through adjacent turns of said helix, and a resistance element electrically connected to said helix and positioned within said cover member out of alignment with the apertures in the upper and lower walls.

6. In a space thermostat, a base member having electric lead terminals thereon, a helically wound temperature sensitive resistance element enclosed in a sheath of metal of relatively high heat conductivity, said helically wound element and said sheath being helically coiled to form a temperature sensitive helix, a resistance connected to said element, connector means for detachably connecting said element and said resistance to said terminals, and an open-sided cover member detachably secured by said connector means to said base member and enclosing and supporting said helix, said cover having apertures through upper and lower walls thereof and so disposed that air passing vertically through said apertures tends to pass between adjacent turns of said helix.

7. A space thermostat for use with temperature control apparatus using temperature sensitive resistance elements, including, a base member adapted for wall mounting, means carried by said base member adapted for electrical connection to said temperature control apparatus, a supporting structure adapted for mounting on said base, frictional connecting members carried by said base and said supporting structure for mounting and electrically connecting said supporting structure on said base, said frictional connectors carried by said base member being conductively joined to the electrical connections of said temperature control apparatus, a helically coiled resistance element having a high temperature coefficient of resistance carried by one portion of said supporting structure, a variable resistance element carried by another portion of said supporting structure, said resistance elements being electrically joined in series with each other and with said frictional connectors, a cover member detachably secured to said base member and enclosing a portion of said supporting member, said cover having apertures in the upper and lower walls thereof so disposed that air passing through said apertures tends to pass between the coils of said helical resistance, and a manually operable portion of said variable resistance extending through a portion of said cover member.

8. A space thermostat, comprising, a base member, an open-sided cover detachably mounted on said base member, a temperature sensitive resistance element mounted on the interior of said cover, and electrically conductive frictional connectors carried by said base member and said cover, said connectors being of such shape as to cooperate with each other to provide both mechanical support and electrical connection between said cover and base member when said cover is mounted on said base member.

9. A thermostat comprising a base member having electric lead terminals thereon, a housing shaped to fit on said base, and temperature responsive means mounted on an inner wall of said housing and having terminals thereon for detachable connection one to each of said lead terminals to additionally provide detachable mechanical connection of said housing with said base.

10. A thermostat comprising a base member having electric lead terminals thereon, a housing detachably secured to said base, said housing comprising two substantially U-shaped members arranged in crossed relationship to provide a cup-shaped housing, and temperature responsive means mounted on an inner wall of said housing and having terminals thereon detachably connected one to each of said lead terminals whereby said housing is also mechanically connected to said base member.

11. A thermostat comprising a base member, a housing detachably mounted on said base member, an air flow passage through said housing, a temperature sensitive resistance element mounted on said housing and positioned within said air flow passage, and a resistance member electrically connected to said element and positioned within said housing in a chamber spaced from said air flow passage.

12. A thermostat comprising a housing, an air flow passage through said housing, a temperature sensitive resistance element mounted on said housing and positioned within said air flow passage, and a variable resistance member electrically connected to said element and positioned within said housing and to one side of said air flow passage, said member having a manually operable knob extending through an opening in said housing to provide means for adjusting the resistance of said member.

13. A thermostat comprising a housing, an air flow passage through said housing, a temperature sensitive resistance element mounted on said housing and positioned within said air flow passage, and a resistance member electrically connected to said element and positioned within said housing and to one side of said air flow passage.

JOHN M. WILSON.
BENJAMIN CYR.

REFERENCES CITED

The following references are of record in the file of this patent:

UNITED STATES PATENTS

| Number | Name | Date |
| --- | --- | --- |
| 516,167 | Rider et al. | Mar. 6, 1894 |
| 1,785,662 | Waterloo | Dec. 16, 1930 |
| 1,919,330 | Hornung | July 25, 1933 |
| 2,236,624 | Littwin | Apr. 1, 1941 |
| 2,238,015 | Doll | Apr. 8, 1941 |

FOREIGN PATENTS

| Number | Country | Date |
| --- | --- | --- |
| 525,111 | Great Britain | Aug. 21, 1940 |